United States Patent Office 2,946,774
Patented July 26, 1960

2,946,774

INTERPOLYMERS OF ETHYLENIC MONOMERS AND ETHYLENIC ESTERS OF ALCOHOLS FROM REDUCTION OF FATTY ACIDS OF GLYCERIDE OIL ACIDS

Roger M. Christenson, Whitefish Bay, Wis., assignor to Pittsburgh Plate Glass Company, Allegheny County, Pa., a corporation of Pennsylvania No Drawing. Filed July 13, 1954, Ser. No. 443,135

4 Claims. (Cl. 260—78.5)

This invention relates to polymers and interpolymers of vinyl and/or acrylic monomers and it has particular relation to polymers and interpolymers as aforesaid, which are so modified as to restrict growth through addition reaction between ethylenic groups to form molecules of relatively short chain length, thus providing products which are initially soluble in aromatic hydrocarbons and adapted for application as coating films; but which ultimately can be cross-linked to form solid relatively insoluble films.

It has long been common practice to provide coating media such as paints and varnishes comprising as vehicles drying or semi-drying oils such as linseed oil, tung oil, soya oil, and the like. These media are natural products and relatively inexpensive to obtain. However, the resistance of the dried films of these materials to deterioration through the agencies of chemicals, alkalies, or water, is not so great as might be desired.

It has also been suggested to provide coating media by the polymerization or interpolymerization of vinylic or acrylic compounds such as contain $>C=CH_2$ groups in terminal position. These interpolymers are soluble in certain relatively expensive solvents such as ketones and chlorinated hydrocarbons. Solutions of the polymers or interpolymers in such solvents have been used as protective and/or decorative coatings on the surfaces of various materials such as sheet metal and other common materials. The films are more resistant to chemical degradation than are those of the older types derived from drying or semi-drying glyceride oils. However, the films are considerably more expensive than the latter. A considerable item of expense is contributed by the relatively expensive solvents required in order to prepare solutions of the interpolymers. The films are often characterized by brittleness and poor adhesion to metals such as iron or steel.

This invention is based upon the discovery that valuable coating media can be obtained through the modification of the polymers and interpolymers of the compounds containing the terminal $>C=CH_2$ groups by interpolymerization of the monomer materials either singly or preferably as pairs with unsaturated esters of higher fatty alcohols derivable by sodium reduction of the carboxyls of the fatty acid esters or glyceride oils such as the drying or semi-drying oils and carboxylic acids such as maleic acid and acrylic acid. The products can be dissolved in aromatic hydrocarbons and films thereof when properly prepared, and dried are of good flexibility, have good adhesion to metals and are of relatively high resistance to chemicals such as alkalies.

Specific examples of monomers which singly or in the form of pairs, or other mixtures may be employed in the preparation of soluble interpolymers in accordance with the provisions of the present invention, are typified by vinyl chloride and vinyl acetate. These are presently regarded as being the preferred members of the class. However, as will be more fully elaborated upon in subsequent portions of the present specification, the invention is by no means limited to this particular combination.

The esters of higher fatty alcohols and lower carboxylic acids used herein will comprise substantial amounts of those esters which contain at least one active, polymerizable double bond which is alpha-beta to a carboxyl group. The fatty alcohols preferably contain unsaturation which is the basis for further oxidative cross-linking upon baking or air drying of the interpolymers. Esters of alcohols derivable by sodium reduction of fatty acids, esters or glyceride oils are typified by esters of alcohols from soya acids and methacrylic acid, acrylic acid, maleic and/or fumaric acid. However, numerous other esters of similar character and structure are also useful and will hereinafter be discussed in greater detail.

The reaction of interpolymerization between the ester of the higher alcohol and the lower unsaturated fatty acid, with the monomer pair containing $>C=CH_2$ groups, preferably is conducted at a somewhat elevated temperature in order to speed up the reaction. It is also desirable to include in the reaction mixture a free radical catalyst such as benzoyl peroxide, or others. In many instances, a solvent medium, preferably an aromatic hydrocarbon such as toluene or xylene, is included in the reaction mixture. In those instances where the monomer or monomers include volatile components such as vinyl chloride, which is a gas or vapor at reaction temperature, the mixture should also be inclosed in an autoclave, or other device for maintaining elevated pressures. The pressures employed may be those autogenically generated by the reactants or if preferred, the mixture may be subjected to any desired degree of additional hydrostatic pressure developed by pumps or other suitable devices.

In the practice of this invention, alcohols suitable for use in preparing the modifying unsaturated esters for the polymers or interpolymers preferably contain at least 16 carbon atoms in a straight chain and in most instances the chain length is even greater, for example from 18 to 24 carbon atoms or thereabouts. Suitable alcohols can be obtained by the sodium reduction in well known manner of fatty acid esters prepared from acids by well known techniques, or glyceride oils such as soya oil, cotton seed oil, linseed oil, safflower oil, China-wood oil, oiticica oil, perilla oil, fish oils, or the like. Lower esters can also be prepared by the alcoholysis of oils. Some of these are classed as semi-drying oils, but all of them contain large amounts of glycerides of drying oil acids. Specific esters and in turn alcohols, derived from such esters include those derived from linoleic acid, ricinoleic acid, linolenic acid, elaeostearic acid, clupanodonic acid, licanic acid and others. In the natural oils, the acids are usually present in the form of mixed glycerides in which various other more completely saturated higher fatty acids such as stearic, palmitic, lauric, oleic, and other acids are also present in varying proportions and relationships. If desired, for purposes of this invention, the more completely unsaturated acids such as those containing a plurality of double bonds in conjugate or nonconjugate relationship with respect to each other, may be separated out from the more saturated acids (as for example by vacuum distillation or crystallization) and may thus be employed in relatively pure state to form esters and in turn fatty alcohols. However, in most cases, this is not necessary since the mixtures of acids from the oils may be employed directly without separation.

Reduction of the carboxyls of the free acids preferably is conducted in such manner as to leave at least a considerable proportion of the double bonds in the hydrocarbon chains unhydrogenated. This may readily be attained by conducting the reduction by methods recognized to be selective or preferential for the carboxyls. Methods of attaining this result are discussed in the book entitled "Industrial Oil and Fat Products," by Alton E. Bailey, copyrighted in 1945, and published by the Interscience Publishers, Inc., 215 Fourth Avenue, New York 3, New York. That portion of this text from page 619 to and including page 621, is particularly pertinent. The text also includes citations of source material which can be referred to for more complete discussion of reduction.

Acids suitable for esterification of the hydroxyls of the higher fatty alcohols preferably include ethylenic groups which may be terminal, as in acrylic and methacrylic acids. They may also be alpha-beta ethylenic and polycarboxylic, as in maleic acid, fumaric acid, itaconic acid, methyl-maleic acid. However, the use of carboxylic acids in which the ethylenic group is in non-terminal position and there is but a single carboxyl, as in crotonic acid, is also contemplated. Acids containing 3 to 6 carbon atoms are preferred.

Where the acid component of the higher alcohol esters contain active, polymerizable ethylenic groups, it may not always be necessary to employ alcohols of higher fatty acids containing a plurality of double bonds. For example, lauryl alcohol, stearyl alcohol, oleyl alcohol, or others can be esterified with acrylic acid or methacrylic acid and the esters may be polymerized conjointly with vinyl chloride and vinyl acetate or similar monomers and/or monomer pairs through addition reactions which are restricted to the acid component of the ester of the fatty alcohol.

More complex esters which may be prepared from the fatty alcohols, unsaturated acids such as maleic acid and a polyol may be used. Such compositions can also contain some saturated dibasic acid such as phthalic or adipic acid.

The esterification reaction between the higher fatty alcohol and the acid may be conducted in well known manner for esterification. The alcohol-acid mixture may be heated with or without catalyst. The anhydrides of the acids, where the latter exist, may be substituted for the free acids and often are preferred. Also, the acids or anhydrides may be replaced by the corresponding acid chlorides. All of these react with the alcohols to provide esters suitable for use in the practice of the present invention. Likewise, the esters may be formed by well known ester interchange reaction in which (A) an ester of a lower alcohol such as methyl or ethyl alcohol and an ethylenically unsaturated carboxylic acid and (B) fatty alcohol are heated to evolve lower alcohol and to form the desired ester.

As previously indicated, monomers containing $$>C=CH_2$$

groups attached to a negative radical such as phenyl, chloride, carbonyl, nitrile and others, have previously been polymerized by addition reaction to form plastics which were useful for various purposes. These may often be employed in forming the interpolymers of this invention. The following constitutes a partial list of a few such monomers which have been employed to form homopolymers or have been interpolymerized with various other ethylenically unsaturated compounds.

Vinylic hydrocarbons such as:
    Styrene
    Alpha-methyl styrene
    Para-methyl styrene
    Divinyl benzene
    Vinyl-toluene
    Isobutylene
Ethylenic halides such as:
    Vinyl chloride
    Vinylidene chloride
Ethylenic nitriles:
    Acrylonitrile
Ethylenic esters such as:
    Vinyl acetate
    Methyl methacrylate
    Methyl acrylate
    Allyl acetate
    Diallyl phthalate
    Diallyl succinate
    Diallyl adipate
    Diallyl sebacate
    Diethylene glycol bis(allyl carbonate)
    Triallyl phosphate
Ethylenic ethers such as:
    Vinyl ether
    Allyl ether
Dienes such as:
    Butadiene
    Isoprene
    Chloroprene
    Isobutylene It will be recognized that some of these monomers, taken singly, are characterized by a capacity for forming polymers of relatively high hardness, infusibility and insolubility, but the polymers are often brittle, or lacking in fusibility. Others are characterized by a capacity for forming polymers which are relatively thermoplastic and soft, though often having good adhesion. It has been suggested to form interpolymers which are of intermediate properties by conjointly polymerizing various combinations of these monomers. Probably, the most common interpolymer is that of vinyl chloride and vinyl acetate, already referred to as constituting a preferred monomer pair for use in the practice of the present invention.

The following constitutes a partial list of monomers which may be selected for purposes of providing polymers or interpolymers which tend to be hard, chemically resistant and of low solubility and adhesion:

Vinyl chloride
    Acrylonitrile
    Styrene
    Methyl methacrylate
    Vinylidene chloride Monomers of the second class, which tend to form polymers which are soft and plastic and which are often used in combination with monomers of the first mentioned group in order to provide interpolymers of good hardness and chemical resistance, but also of good plasticity, adhesion, solubility, etc., are tabulated as follows:

Vinyl acetate
    Vinyl ethers (preferably homogeneous)
    Butadiene
    Isoprene
    Chloroprene
    Isobutylene In most instances, in the practice of this invention monomer pairs will be selected from these two groups with a view of obtaining some of the properties of polymers of monomers of each type, but the invention also comprises the selection of single monomers from either of these lists, and these monomers are then interpolymerized with an appropriate ester of an alcohol derived by reduction of a glyceride oil acid and a lower acid containing an ethylenic group.

In proportioning the several components of the secondary or ternary interpolymers, it is suggested that for a secondary interpolymer of an ethylenic ester of a higher fatty alcohol and a lower carboxylic acid, and single monomer, that the monomer be employed in a range of about 30 to 80 percent by weight based upon the mixture of the two. Where ternary, or higher mixtures comprising two or more monomers are employed, the ethylenic ester of the higher alcohol may comprise about 10 to 80 percent by weight, the rest being a mixture of the monomers in which monomer mixture, one monomer may comprise 10 to 90 percent by weight of the total monomer component.

Reference may now be made to the following examples which illustrate the application of the principles of the of the invention to specific compositions.

Example I

The alcohols in this example were a mixture from the sodium reduction of soya oil. The acid components of this oil are understood to be approximately as follows:

| | Percent |
|---|---|
| Linoleic acid | 51.5 |
| Oleic acid | 34.4 |
| Palmitic acid | 6.8 |
| Stearic acid | 4.4 |
| Linolenic acid | 2.3 |
| Arachidic acid | 0.6 |

Naturally the proportions of acid will vary somewhat with different oils and there probably are other acids present in small amount. This composition is given by way of illustration only. The alcohols derived by selective reduction of esters of these acids were esterified with maleic acid to provide a product suitable for interpolymerization with monomers.

The esters were mixed with an equal amount by weight of styrene and 2 percent by weight based upon the interpolymerizable mixture of cumene hydroperoxide which constituted a free radical initiator. The mixture was dissolved in xylene in an amount to obtain a concentration of 50 percent by weight and was then introduced into a reaction flask under a reflux condenser. It was refluxed for a period of 16 hours to provide a product containing 48.3 percent by weight of combined monomer. Some xylene was removed by distillation. The product had a viscosity of J at a concentration in xylene of 63.5 percent total solids.

The interpolymer was apparently of molecules of intermediate or short chain length which were adapted to undergo further interpolymerization and cross-linking upon baking. Films of the material on metal when so baked constituted valuable coatings.

For purposes of testing the material as a coating medium, the solutions thereof were catalyzed with a commercial drier mixture containing soluble organic compounds (soaps) of lead and cobalt in amounts, calculated as the metals respectively of 0.3 percent of lead and 0.03 percent of cobalt. The catalyzed mixture was then spread as films upon test panels of glass and of steel which were baked at 300° F. for one hour in order to attain insolubility and hardness through cross-linking.

The resultant films were clear and flexible. The Sward hardness on glass was 26, while that on steel was 36. The impact resistance was twelve inch pounds and the flexibility determined by flexing test panels on a ½ inch tapered mandrel, was greater than 20. Alkali resistance of the films was determined by contacting them with aqueous sodium hydroxide of 3 percent concentration until they failed. The time required for such failure was 70 hours which is a relatively high value, indicating that the material is of good resistance to alkali.

Example II

This example illustrates the modification of an interpolymer of vinyl acetate and vinyl chloride in order to obtain solubility in aromatic hydrocarbons such as xylene through copolymerization of the monomer pair in the presence of the crotonic acid ester of alcohols derived by reduction of soya oil. The interpolymerizable mixture comprised:

| | Parts by weight |
|---|---|
| Crotonic acid esters of fatty alcohols | 20 |
| Vinyl acetate | 40 |
| Vinyl chloride | 40 |

The mixture was catalyzed with 2 percent by weight based upon the mixture of benzoyl peroxide. The mixture was reacted in a closed bomb which was heated at 75° C for 16 hours to provide an interpolymer; the unreacted vinyl chloride and vinyl acetate were distilled. The product contained 60 percent by weight of combined monomer and at a dilution of 49.8 percent in xylene, had a viscosity of A+. The interpolymer product apparently was of short or intermediate chain length and was suitable for further baking in order to effect cross-linking between contiguous molecules. Films of the material when so baked, were hardened and chemically resistant.

Test panels of glass and of steel were coated with this material. The films baked at 300° F. for 60 minutes, in each instance to a Sward hardness of 22. The films withstood the action of 3 percent sodium hydroxide for 234 hours.

Example III

An interpolymer of vinyl acetate and vinyl chloride soluble in xylene was prepared by the conjoint interpolymerization of said pair with a maleic acid ester of a mixture of higher fatty acids from the sodium reduction of soya oil. The interpolymerization in this instance was effected in an aromatic solvent, namely xylene, which was employed in a proportion of 100 percent by weight based upon the interpolymerizable mixture. The composition comprised:

| | |
|---|---|
| Maleic acid ester of higher alcohols | 20 parts by weight. |
| Vinyl acetate | 40 parts by weight. |
| Vinyl chloride | 40 parts by weight. |
| Catalysts (benzoyl peroxide) | 2 percent based upon the interpolymerizable mixture. |

The mixture was introduced into a closed bomb and polymerized by heating for 16 hours at 75° C. The product comprised 57.7 percent combined monomer and was of a viscosity of B+ at a combined solids content of 49 percent in xylene.

Test panels of glass and of steel were coated with the material and baked for 60 minutes at 300° F. to provide films which were clear, flexible and somewhat elastic. These films resisted the action of 3 percent sodium hydroxide solution for 228 hours thus indicating that the products were of good chemical resistance.

Example IV

This example is similar to Example III, except that the maleic acid esters of the higher alcohols were replaced by corresponding methacrylic acid esters. The conditions of reaction in other respects corresponded to those disclosed in the former example. The product comprised an interpolymer of intermediate chain length which was soluble in xylene, which comprised 56.0 percent by weight of combined monomer and had a viscosity of G+ at a dilution of 46.7 percent in xylene. Films of the material on glass when baked at 300° F. for 60 minutes had a hardness of 22 on the Sward scale, withstood aqueous sodium hydroxide of 3 percent concentration for 93 hours.

The forms of the invention as herein disclosed are to be considered as being by way of example rather than limitation. It will be apparent to those skilled in the art that many modifications may be made therein without departure from the spirit of the invention or the scope of the appended claims.

I claim:

1. An interpolymer soluble in aromatic hydrocarbon solvents and being essentially of approximately equal parts by weight of vinyl chloride and vinyl acetate and 20 percent by weight based upon the total mixture of an ester of methacrylic acid and an alcohol derived by selectively reducing the carboxyl of a drying oil acid, said interpolymer, when spread as a film, being adapted to dry by oxidative cross-linking to a hard, durable, alkali resistant state.

2. An interpolymer soluble in aromatic hydrocarbon solvents and being essentially of approximately 10 to 80 percent by weight of an ester of a monohydric alcohol containing at least 16 carbon atoms in a straight chain, said chain containing a plurality of carbon to carbon double bonds, which are susceptible to oxidative cross-linking, and an ethylenically unsaturated carboxylic acid containing 3 to 6 carbon atoms, the rest of the interpolymer being of a mixture of monomers comprising a vinyl halide and vinyl acetate, the mixture of said monomers containing from 10 to 90 percent by weight of each, said interpolymer, when spread as a a film, being adapted to air dry to a hard, alkali resistant state.

3. An interpolymer soluble in aromatic hydrocarbon solvents and being essentially of a mixture of (A) approximately 10 to 80 percent by weight of an ester of a monohydric alcohol containing at least 16 carbon atoms in a straight chain, said chain containing a plurality of double bonds, which are susceptible to oxidative cross-linking, and an ethylenically unsaturated carboxylic acid of the class consisting of acrylic acid, methacrylic acid, crotonic acid, maleic acid and fumaric acid, and (B) a mixture of a pair of monomers consisting essentially of 10 to 90 percent of vinyl chloride, the rest of the monomers being essentially vinyl acetate.

4. A method of coating surfaces of solid bodies, which comprises applying thereto a solution in an aromatic hydrocarbon of the interpolymer as defined in claim 3 and then baking the body at a temperature of about 300° F. to convert the coating on the body into a hard, alkali resistant, insoluble state by cross-linking of the interpolymer molecules.

References Cited in the file of this patent

UNITED STATES PATENTS

| | | |
|---|---|---|
| 2,168,535 | Nuesslein et al. | Aug. 8, 1939 |
| 2,574,847 | Schertz | Nov. 13, 1951 |
| 2,636,024 | Wolf | Apr. 21, 1953 |
| 2,673,151 | Gerhart | Mar. 23, 1954 |
| 2,836,580 | Wesp et al. | May 27, 1958 |

FOREIGN PATENTS

| | | |
|---|---|---|
| 639,999 | Great Britain | July 12, 1950 |